United States Patent [19]

Cooper et al.

[11] Patent Number: 4,492,714

[45] Date of Patent: Jan. 8, 1985

[54] NON-PROTEIN, HIGH STABILITY FAT EMULSION COMPOSITION AND METHOD OF PRODUCTION

[75] Inventors: Stephen E. Cooper; Donald L. Leohner, both of Menomonie, Wis.

[73] Assignee: Beatrice Foods Co., Chicago, Ill.

[21] Appl. No.: 469,900

[22] Filed: Feb. 25, 1983

[51] Int. Cl.³ .......................... A23D 5/00; A23D 5/02
[52] U.S. Cl. .................................... 426/602; 426/613; 426/98
[58] Field of Search .................. 426/98, 103, 60, 602, 426/613

[56] References Cited

U.S. PATENT DOCUMENTS

| | | | |
|---|---|---|---|
| 3,091,567 | 5/1963 | Wurzburg et al. | 426/98 X |
| 4,045,589 | 8/1977 | Petrowski et al. | 426/98 X |
| 4,242,364 | 12/1980 | Buddemeyer et al. | 426/98 |
| 4,331,689 | 5/1982 | Shemwell | 426/98 |

*Primary Examiner*—Robert Yoncoskie

*Attorney, Agent, or Firm*—Murray, Whisenhunt and Ferguson

[57] ABSTRACT

There is provided a protein-free and low sodium high stability fat emulsion which comprises on a solid basis, 10 to 75% of an edible fat having an average particle size of 4 microns or less, 0.1 to 3% of an emulsifier, 8 to 20% (based on the fat) of an edible hydrated, substantially undextrinized, lipophilic starch in submicroscopic particle size, and the remainder of the solids being principally a filler. The emulsion may be either a water emulsion or a dry powdered emulsion. The emulsion is prepared by mixing the fat, emulsifier, starch and filler in water. The mixture is cooked at an elevated temperature if the starch has not been previously cooked to hydrate starch. The mixture is sheared such that the fat is divided into an average particle size of 4 microns or less and the starch is dispersed in submicroscopic form. The sheared mixture is then dried to a moisture content of 7% or less. The starch may be dispersed to the submicroscopic particle size either prior to or during the process.

25 Claims, No Drawings

NON-PROTEIN, HIGH STABILITY FAT EMULSION COMPOSITION AND METHOD OF PRODUCTION

The present invention relates to a high stability emulsion of finely divided fat, and more particularly to such emulsions which are protein-free and have no or low sodium contents. The invention also relates to a method of producing such emulsions.

BACKGROUND OF THE INVENTION

Stable emulsions of finely divided fat have been used in the art for many purposes, including that of powdered shortenings, carriers, e.g. for artificial flavors, and in coffee whiteners. The use of these emulsions in certain environments has presented difficult problems to the art, due to the instability of the emulsion in those environments. Thus, by way of examples, the usual emulsions provided by the art are not stable in either high or low pH environments, alcohol containing environments, freeze-thaw environments and high temperature environments. These and other such environments may be referred to as "instability environments," and the art has proposed a number of solutions to this instability problem.

The difficulties of these instability environments can be illustrated by the example of a coffee whitener. Thus, while the more usual emulsions are quite satisfactory for more typical uses, e.g. as dough ingredients and as carriers, these more usual emulsions are not satisfactory in coffee whiteners, since the requirements for coffee whiteners are much more stringent than the requirements for the emulsions in the typical uses. Among the special problems presented for use of these emulsions as a coffee whitener is the ability of the emulsions to be quickly dispersed in a nonagglomerating manner, at low solids content, in hot brewed coffee, and without settling in the brewed coffee, "oiling out" or producing an unacceptable taste. In addition, the coffee whiteners must provide a high whiteness to the coffee. Such properties are not common to the necessary properties of such emulsions for the more typical uses, and the art has long appreciated that an emulsion suitable for such other typical uses is not necessarily suitable for a coffee whitener. Indeed, most often, emulsions which are quite acceptable for these other typical uses, are quite unacceptable for coffee whiteners.

While many powdered dry fat emulsions are known, as discussed above, only a few of these emulsions are acceptable as coffee whiteners for the foregoing reasons. Principally, acceptable emulsions have contained from about 25 to 50% vegetable fat, 30 to 65% of a filler carbohydrate, usually corn syrup solids or sugar, 4 to 15% protein, usually a caseinate, about 1 to 4% emulsifiers, and minor amounts of stabilizers, colors, flavors, anti-caking agents and the like. The fat, of course, is finely divided in order to effect whitening when dispersed in the coffee.

The protein, especially the caseinates, are necessary in these prior whitener compositions, for two reasons. First, without the protein, the prior art had found that the mixed ingredients, dispersed in water, formed an emulsion that cannot be effectively dried to produce the powdered coffee whitener. Second, the prior art has proceeded on the assumption that without the protein, acting as a protective stabilizer, a stable emulsion will not result in the brewed coffee, causing the difficulties discussed above. Therefore, generally speaking, prior art coffee whiteners have always incorporated substantial amounts protein, e.g. caseinates, into the coffee whitener emulsion composition.

As another example of an instability environment, emulsions of this type are used in food compositions which must be retorted in packaging, e.g. puddings, custards and the like. Retort temperatures in the food composition, e.g. 105° C., cause instability in the usual fat emulsions. Again, the approach of the prior art has been to incorporate substantial amounts of protein, e.g. caseinates, in the fat emulsions to at least partially compensate for the instability of the emulsion.

A further important example of an instability environment is that of acid compositions which require a high fat content. The combination of low pH and high fat requirements cause most unstable conditions. While coffee is a relatively low pH composition, the amount of fat required to whiten the coffee is relatively low. Creamers, on the other hand, must provide relatively high fat contents to the creamed compositions, e.g. the fat emulsion used as a creamer will usually have 50% or more fat. When the creamers are used in acid compositions, instability of the emulsion is a most difficult problem. The prior art emulsions have not been satisfactory in these compositions, especially in the more acid systems such as fruit drinks, carbonated beverages, wine and the like.

Thus, as examples, but not all inclusive, instability environments include: coffee whiteners; creamers for fruit drinks, soft drinks (liquid or powder), soups, brewed tea (hot or cold), gelatin desserts; bases for sherbert-like frozen desserts; shortening powders; fat for vinegar containing salad dressings; gravies; and non-dairy bar mixes. The present fat emulsion, as explained below, is applicable to all of the above and other instability environments.

Other examples of "instability environments" could also be provided, but in summary, all of the "instability environments" have necessitated special fat emulsions, nearly all of which special fat emulsions rely upon the inclusion of substantiall amounts of protein to improve the emulsion stability.

However, the inclusion of protein in these special emulsions causes distinct disadvantages. The protein, first of all, is relatively expensive, and, indeed, constitutes a significant cost of the emulsion. Further, the inclusion of dairy protein in the emulsion renders the emulsion unacceptable to some ethnic groups in some uses, e.g. coffee whitened with a dairy product. Also, the protein is, generally, the least soluble of the ingredients in the emulsion, and in the case of a coffee whitener, delays full dispersion of the fat particles in the coffee to achieve whitening thereof. Additionally, the protein presents a hypoallergenic problem to some users. Finally, the protein of choice is sodium caseinate, and the use of substantial amounts thereof in these instability environments results in increased sodium contents of the resulting composition. Of course, excessive sodium in diets is being recognized as a health problem. Further, the isoelectric point of sodium casenate (pH of about 4.6) renders it unstable in acid environments, e.g. at a pH lower than about 4.6.

Accordingly, the art has sought high stability emulsions which do not require the use of protein therein. One approach of the art in this regard is illustrated by U.S. Pat. No. 4,242,364, wherein the protein in a coffee whitener is simply eliminated and its function is more or less compensated by specific combinations of emulsifiers and carbohydrates. However, these compositions provide considerably less than desirable whiteness in the brewed coffee, which indicates that the stability is not as desired.

U.S. Pat. No. 4,199,605 discloses that a coffee whitener may be prepared with fat, an emulsifier and a high proportion of sugar and need not include protein, although a minor amount of protein may be included. However, the resulting composition cannot be spray-dried into a powder, and must be stored in a refrigerated or frozen condition.

As can therefore be appreciated, simply eliminating the protein, and adjusting other ingredients of the composition, has not proved successful and has not been generally adopted in the marketplace.

U.S. Pat. No. 4,045,589, however, discloses a coffee whitener which is free of protein and yet provides reasonably good whitening properties. That composition is similar to the prior art compositions containing protein, except that the protein as been replaced with a chemically modified dextrinized starch having a lipophilic character. This composition, however, requires a relatively large amount of the chemically modified dextrinized starch. Unfortunately, the relatively large amount of dextrinized starch in the whitener composition correspondingly requires a relatively long stirring period for dispersing the whitener and requires more that the usual effective amount of whitener. In addition, chemically modified dextrinized starches are relatively expensive, and the cost of producing such a whitener is higher than that desired to produce a competitive product.

U.S. Pat. No. 4,331,689 describes a protein-free fat emulsion which is said to be useful as a coffee whitener, wine creamer and sour cream mixer (instability environments) and uses a cooked or prejelled lypophilic starch in lieu of protein. However, a very large amount of starch is required, i.e. 60 to 85% of the fat. Such a large amount of starch is most expensive.

It would, therefore, be an advantage to the art to provide a high stability, protein-free emulsion, which may have no or low sodium contents, which does not require large amounts of relatively expensive ingredients and which does not adversely change the characteristics or flavor of the composition in which it is used.

OBJECTS OF THE INVENTION

It is therefore an object of the invention to provide a high stability, protein-free fat emulsion which is made of relatively low amounts of the more expensive ingredients. It is a further object of the invention to provide such emulsions which are easy to disperse, e.g. in brewed coffee. It is a further object to provide such emulsions which can effectively function in compositions which include instability environments, without adversely changing the character or flavor of the composition. Further, it is an object to provide such fat emulsions which are either essentially sodium-free or are low sodium content emulsions. It is another object of the invention to provide a process for producing such emulsions. Other objects will be apparent from the following disclosure and claims.

BRIEF DESCRIPTION OF THE INVENTION

The present invention is based on three primary discoveries and several subsidiary discoveries. First of all, it is discovered that starch could, indeed, replace the protein in a conventional emulsion, but that the use of starch requires both a critical selection thereof and a critical physical form thereof in order to be effective in instability environments and with an acceptable amount of starch in the fat emulsion, e.g. an amount of starch low enough that the characteristics of the composition into which the fat emulsion is placed are not adversely affected.

In regard to the selection of the starch, two critical selections from the many forms of starches available to and suggested by the art must be made. Thus, it has been found that a critical selection of a lipophilic starch must be made. Second, there must be a critical selection of a substantially undextrinized starch. Thus, the dextrinized starch of U.S. Pat. No. 4,045,589 is not acceptable for present purposes.

In regard to the physical form of the starch, two critical selections out of the many possible physical forms must be made. First, it has been found that a critical selection of a hydrated form of the starch must be made. Second, there must be a critical selection of the starch being in at least submicroscopic particle size. Thus, the lipophilic starch of U.S. Pat. No. 4,331,689 is not acceptable for present purposes.

When these four critical selections of the starch are made, the fat emulsion made therewith will effectively function in instability environments with starch contents (based on the fat) as low as 8%. Indeed, starch contents above 20% provide little or no advantage to the fat emulsion.

Thus, these low starch contents not only result in a relatively inexpensive fat emulsion, but do not substantially adversely affect the characteristics of the compositions into which they are placed, e.g. coffee whiteners. Further, by eliminating the usually included sodium caseinate, the emulsions either have essentially no sodium or low sodium contents.

Accordingly, the starch must be a hydrated, predominately submicroscopic form of a lipophilic, substantially undextrinized starch. If the starch of the fat emulsion does not have these characteristics, the benefits of the invention will not be achieved, and, particularly, the emulsion cannot effectively function with the low amounts of starch, as provided by the present invention.

As a second basic discovery, it was found that with the present starch selections wide latitude is provided in the amount and type of fat used in forming the emulsion. Thus, the present invention allows the manufacturer wide latitude in his choice of fats and amounts thereof, and this is important for cost control as the cost and availability of various possible fats change from time to time.

As a third primary discovery, it was found that the starch could be placed in a hydrated and submicroscopic form either prior to forming the emulsion or in producing the emulsion. This is of significant advantage in manufacturing latitude.

As a further subsidiary discovery, the increased efficiency and higher stability is achievable only when the fat is in a finely dispersed form, i.e. having an average particle size of 4 microns or less. With larger average size fat particles, the emulsion will not have the present high stability.

Thus, briefly stated, the present invention provides a high stability, protein-free fat emulsion, which comprises on a solid basis, 10 to 75% of an edible fat having an average particle size of 4 microns or less, 0.1 to 3% of an edible emulsifier, and 8 to 20%, based on the weight of the fat, of an edible, hydrated, substantially undextrinized lipophilic starch, which is predominately in submicroscopic form, with the remainder of the solids being principally an edible filler, e.g. a carbohydrate. The emulsion may be in a dry powdered form, or it may be in a water emulsion form.

The composition is prepared by mixing the fat, emulsifier, starch and filler in water, mechanically shearing the admixture such that the fat is divided into an average particle size of 4 microns or less and drying the sheared admixture to a moisture content of 7% or less, and wherein the starch is predominately in a submicroscopic form, either prior to the said processing or during the shearing step. Thus, when the starch used in the process is not in a predominately submicroscopic form, prior to the mixing step, the shearing step must be sufficient to achieve that form.

DETAILED DESCRIPTION OF THE INVENTION

As noted above, the present emulsion may be either a dry powdered emulsion or a liquid emulsion, and the liquid form may be either an undried form of the emulsion or may be a reconstitution in water of the dried emulsion. For sake of conciseness herein, the invention will be hereinafter discussed, primarily, in terms of the dry emulsion.

As noted above, with the present invention, the fat (for present purposes the term "oil" is an interchangeable term) used in the emulsion is not critical and may be any of the fats normally used in dry powdered fat emulsion. Thus, there may be used animal fats, e.g. lard and tallow, or vegetable fats, but vegetable fats are preferred. The fats may be in their native state, or partially or fully hydrogenated. The fats may be liquids or solids at room temperature. Any of the vegetable fats may be used, including those fats taken from olives, rape seeds, cocoa butter, sesame seeds, sorghum, babassu, and the like, but it is preferred that the more bland vegetable fats be used, e.g., coconut oil, soy bean oil, cotton seed oil, peanut oil, sunflower oil, corn oil, rapeseed oil, and safflower seed oil, or mixtures of any thereof. While not necessary, it is preferred that the fats have a Whiley melting point of between 90° and 105° F., since fats with these melting points are easy to process, and provide particularly good results.

Also as noted above, the amount of fat may vary widely, because of the unique properties of the starch, and fat contents as low as 10% and up to 75% provide quite acceptable results. However, the fat content will be varied, depending on the end product intended. Hence, when the end product is, for example, a coffee whitener, it is preferred that the fat content is from 15 to 40%, and, more preferably, for a higher quality coffee whitener, the range is 32 to 37%. On the other hand, when, for example, the end product is an acid stable creamer, e.g. wine or fruit drink creamer, or a soft-serve ice cream base, higher fat contents are preferred, i.e. 45 to 75%.

It is necessary that the fat be in a very finely divided form, i.e., the fat must have an average particle size of 4 microns or less. Otherwise, the fat will not be sufficiently divided to give the required emulsification for high stability. More preferably, however, the average particle size of the fat is less than 3 microns or less than 1.5 microns, e.g. from 0.5 to 1.5 microns.

The emulsifiers may be chosen from a variety of suitable fat/water emulsifiers. It has been found that suitable emulsifiers improve the functionality of the emulsion and allow reduced amounts of the present starch. Further, even though there is a wide variety of emulsifiers which may be used, it is cautioned that some emulsifiers and combinations thereof, conventionally used with prior art protein based fat emulsions, are ineffective and in some cases can exhibit antagonistic effects with the present starch, especially when used at the usual levels in protein based fat emulsions.

Thus, to avoid the potential of such problems, it is preferred to use one or more of the following emulsifiers: mono- and diglycerides; glycerol monostearates; sorbiton monostearate; esters of carbocyclic acids such as lactic, citric, and tartaric acid with mono- and di-glycerides; monosodium phosphate derivatives of mono- and di-glycerides; lecithin; sodium stearoyl lactylate; calcium stearoyl lactylate; diacetyl tartaric acid ester of mono- and di-glycerides; succinylated mono- and di-glycerides; acetylated mono-glycerides; hydroxylated lecithin; propylene glycol mono- and di-esters of fatty acids; polyglycerol ester of fatty acids; and lactylic esters of fatty acids. However, sodium stearoyl lactylate and mono- and di-glycerides, e.g. diacetyl tartaric acid esters of mono- and diglycerides work extremely well when used in amounts of about 0.2–1.5% of the emulsion on a dry basis, providing the emulsifiers have been first dispersed in the oil phase of the emulsion. Furthermore, lecithin and mono- and di-glycerides work well when used in the oil phase in amounts of about 0.1–0.3%, especially when a hard (130° F. plus melting point) mono- and di-glyceride is added to the water phase of the emulsion in amounts of about 0.5–2.5%.

Sodium stearoyl-2-lactylate is a preferred emulsifier for coffee whiteners. Sodium stearoyl-2-lactylate, apparently, has the ability to react with the starch, in that sodium stearoyl-2-lactylate modifies the amylose and amylopectin. This results in improved stability for the very difficult instability environment of brewed coffee.

The most important ingredient of the composition, as noted above, is the edible starch. The particular starch as opposed to the characteristics and form thereof, as noted above, is not critical, and may be any of the conventional lipophilic modified starches, including those derived from sorghum and waxy-sorghum, arrow-root, sago, and the like, but it is preferred, for convenience and ready sources thereof, that the lipophilic starch be a lipophilic modification of one of waxy-maize, rice, wheat, corn, potato and tapioca starches, or mixtures thereof. Lipophilic modifications of starch are well known to the art and need not be described herein. Lipophilic modified starches are commercially available, e.g. National 1817 starch, and these commercially available lipophilic starches are quite suitable for present purposes. The best mode known is octenyl succinic anhydride lipophilic modification of maxy maize, which is the above National starch.

While not necessary to the function of the emulsion, the composition will contain a filler. Indeed, aside from the fat, emulsifier, and starch, the remainder of the solids will principally be the filler. The filler functions to keep the fat particles, in the dried composition, dispersed and separated form each other so as to avoid agglomeration in storage, transportation and the like. Again, while not necessary, the filler may give a sweetening effect to the emulsion, especially when corn syrup solids, sugar or the like are used as the filler. As can therefore be appreciated, the filler is not at all critical to the invention and may be chosen from any of the known fillers. Thus, any of the usual carbohydrates may be used and especially the easily water dissolvable carbohydrates such as sugars, vegetable gums, and the like, but the more conventional corn syrup solids, sugar, malto-dextrins and dextrin are preferred.

In addition to the filler, the composition may contain any of the conventional ingredients used in emulsions, including one or more of flavors, colors, stabilizers, preservatives, antioxidants, and anti-caking agents in the usual amounts for emulsions of the present nature. Conventional stabilizers include food grade salts and gums. Gums, e.g. up to 2%, such as guar gum, alginates, and carrageenin may be used. Salts, such as dipotassium phosphate, disodium phosphate, sodium citrate, tetrasodium pyrophosphate, and sodium acid pyrophosphate form particularly good stabilizers.

Food grade acids and acidic stabilizing salts, also improve the encapsulating ability of the present starch. The preferred level of these acids and acidic salts for stabilization and improved encapsulation purposes is that which is sufficient to lower the pH of the composition from which the emulsion is made to about 6.5 to 4.0. The use of food grade acids or acidic stabilizing salts for encapsulation improvement is especially desirable in formulations containing sodium stearoyl lactylate or in formulations intended for uses where the final pH of the composition will be on the acidic side, for example, orange juice creamers.

As noted above, the composition may be in a dried form or in a liquid form, e.g. up to 70% solids, and the dried form may be any of the conventional dried forms such as the freeze dried form, the sprayed form, or a vacuum dried form, although the two former are preferred. The spray dried form and the freeze dried form provide physical configurations more conducive to rapid solubility of the composition.

While the water emulsion may be packaged after it is formed in the fluid state, e.g. in a refrigerated or frozen condition with up to 50% solids, it is most often dried to a low moisture content, e.g. 7% or less, and then packaged.

As noted above, a critical feature of the invention is that of providing the starch in predominately submicroscopic form. It has been discovered that when the starch is in this form it is far more efficient than the same starch which has not been placed in submicroscopic form.

While the particular method for placing the starch in submicroscopic form is not critical, so long as the submicroscopic form is achieved, the preferred method is that which involves a hydration step, since hydration of the starch is additionally necessary and hydration places the starch granules in a form where they may be far more easily reduced to submicroscopic particle size. Starch granules, the ordinary form of starch, are relatively large (visible) particles. In ordinary starch processing, e.g., conventional cooking and mixing, the granules will remain largely intact. Conventional cooking will cause the granules to at least partially hydrate and swell. In the swollen state the granules are more friable. Thus, when starch is cooked for conventional times, e.g. 3-5 minutes, and at conventional temperature, e.g. 170° F., the granules at least partially hydrate and swell. If this cooking is continued for extended times the granules will reach a state where they are essentially fully hydrated and swollen. At this point, the granules may begin to disrupt into small amounts of submicroscopic form, but this amount is not adequate for present purposes. With even further cooking greater amounts of the starch granules will disrupt into a submicroscopic form, but here again, the amount of this disruption is not sufficient for present purposes. Accordingly, the starch must be further processed, beyond even extended conventional cooking, to achieve the required submicroscopic form thereof. There are two methods of this further processing.

One method is to continue cooking the starch at elevated temperatures until enough granules disrupt to form an adequate amount of submicroscopic form of the starch, but this requires considerable cooking time, e.g. two hours at 185° F. In addition, some deterioration of the starch will commence with extended cooking and with prolonged cooking further deterioration will occur. Therefore, providing the submicroscopic form by long cooking times is not the preferred form of the invention.

The second method, and the preferred form of the invention, is that of cooking the starch until the starch is essentially fully hydrated and swollen and subsequent thereto subjecting the hydrated and swollen starch to high mechanical shear forces. The mechanical shear must be of a character and of a shear factor that the swollen granules will be dispersed into submicroscopic form. In part, the requirements for this mechanical shear will depend upon the degree of prior cooking, and especially the temperature and time thereof. However, for any particular starch, cooked at any particular elevated temperature and for any particular time, the adequacy of the cooking and/or the subsequent mechanical shearing can be tested by a simple method.

A sample thereof is subjected to the conventional starch iodine staining procedure. This procedure is well known to the art and need not be described herein. After staining, a portion of the stained sample is viewed under a conventional laboratory microscope of the highest conventional power (1000X). Any starch, not in a submicroscopic size will appear in the field of view as colored particle (ranging in color from a red to a purple—depending on the starch). If all of the starch is less than microscopic size, no colored particles can appear in the field of view. Thus, for purposes of the present specification and claims, submicroscopic form means that the particle sizes of the starch are less than that which can be seen under 10000X magnification (of course, having been first properly stained).

It will be appreciated that this test will demonstrate that the starch has been reduced to a submicroscopic form, but it does not determine how small the particle size actually is. Indeed, it is believed that the method reduces the starch below "particle" size form and all the way to a molecular dispersion of the starch. However, laboratory experiments have not been conclusive that a molecular dispersion is obtained.

Thus, for any particular combination of cooking and mechanical shearing desired, if the above-described microscopic test shows substantial amounts of stained starch particles, then either greater cooking temperatures and/or times or higher mechanical shear must be employed. On the other hand, if the test does not show any, or very few, stained particles, then all or essentially all of the starch granules have been dispersed into submicroscopic form and the particular cooking temperatures/times and mechanical shearing have been satisfactory for purposes of the present invention.

Thus, with this test, one may use a variety of cooking times and temperatures, but generally speaking, the cooking temperature should be at least 175° F., and up to about 210° F. or even 300° F. but more preferably at least 180° F. to 190° F. In regard to time, generally speaking, the cooking at those elevated temperatures should be at least 5 minutes (for the higher temperatures), and more preferably 10 minutes. About 15 minutes cooking time at moderately elevated temperatures is usually quite sufficient for most starches. These lower cooking times are especially sufficient when the cooking is carried out in the presence of an acid, as explained hereinbelow.

It will be appreciated that the present cooking step swells the starch granules and hydrates the starch. However, mere hydration, in and of itself, is not satisfactory for purposes of the present invention—the submicroscopic form must also be obtained—and to this end cooking times and temperatures, as described above, are used. In this regard, gelatinization is a good means of determining an adequate cooking of the starch granules, since when gelatinization has occurred, the starch has not only been hydrated but has been sufficiently swollen to achieve disruption to submicroscopic form by appropriate shearing. Hence, the present cooking step will usually be such that at least essentially full gelatinization of the starch has occurred.

The mechanical shear can be achieved by a variety of mechanical devices, including a high shear pump, a colloid mill, a high speed shearing mixer (Beckman Homogenizer or the like), sonic homogenizers and conventional dairy homogenizers operated at high pressures. The particular mechanical device used is not critical, so long as the starch is reduced to submicroscopic form. It will be appreciated, in this regard, that if essentially no submicroscopic form of the starch results, correspondingly essentially no benefits of the present invention will be achieved. On the other hand, if the starch is partially reduced to submicroscopic form, correspondingly the benefits of the present invention will be partially achieved, and if complete or essentially complete reduction of the starch to submicroscopic form is achieved, then, correspondingly, complete or essentially complete benefits of the present invention will be achieved. Therefore, the starch should be at least predominately in submicroscopic form, and more preferably is essentially only in submicroscopic form. Most preferred, however, is when all of the starch is in submicroscopic form, i.e. no stained particles are visible in the above described microscopic test.

It is emphasized that processing the starch with high mechanical shearing will not produce the submicroscopic form, unless the starch has been priorly sufficiently cooked at elevated temperatures to hydrate and swell the granules. Conversely, it is emphasized that simply cooking at elevated temperatures and without the concomitant high mechanical shearing, will not produce the submicroscopic form, unless the cooking is for very extended times, as noted above, and then only with some starches and to minimumly acceptable amounts. One can only be certain that the submicroscopic form has been achieved by the above noted microscopic test.

As noted above, the starch may be rendered in submicroscopic form prior to being added to the other ingredients of the emulsion composition. Thus, the starch can be cooked and sheared, as discussed above, prior to being added to the other ingredients of the emulsion composition. However, since the emulsion must normally be homogenized prior to drying, it is preferred that the submicroscopic form be obtained by a high shearing homogenization of the emulsion ingredients, including the starch. Of course, in this form of the process, the ingredients, or at least the starch, must be priorly cooked at the elevated temperature, and the high shearing homogenization must provide sufficient mechanical shearing to achieve the fat dispersion and the submicroscopic form of the starch. This can be very conveniently achieved by use of a standard dairy homogenizer operated at relatively high pressures which will produce high shearing during homogenization.

As a further feature of the invention, it has been discovered that the starch granules can be more easily cooked to the point where they are so hydrated and swollen as to be in good condition for mechanical shearing to produce the submicroscopic form, when the cooking step is carried out in the presence of a food-grade acid, e.g. phosphoric acid, sodium-acid pyrophosphate, citric acid, acetic acid, tartaric acid and the like. The presence of the acid in the cooking step not only decreases the cooking time required, and to some extent the temperature, for achieving adequate hydration and swelling of the granules, but in addition places the granules in such a condition that they can be adequately sheared to submicroscopic form with lower shear forces. To some extent, this more rapid hydration and swelling with the acid cook depends upon the particular starch, since starches vary as to the ease of swelling both with or without acid addition. The ease of swelling follows, generally, the ease of gelatinization of starches which is well known to the art, and for starch choice purposes, this general rule may be followed. However, it has been experimentally found that dextrinized starches (dextrins) cannot be effectively used in the present invention. It will therefore be appreciated that when the acid cooking step is performed, it should be at a pH and for a time and temperature such that no substantial dextrinization will occur. Dextrinization of a starch can be easily determined by standard tests, and when the acid cooking step is used, those tests may be performed to insure that the starch has not been dextrinized. While the lowest pH to avoid dextrinization will vary somewhat with temperature and time, generally speaking, the pH of the acid cooking step should not be below about 4.0, and usually will be carried out at a pH of 4.2 or above, in this regard, "substantially undextrinized" means that any dextrinization of the starch is below that which will substantially interfer with the starch to hydrate and swell for shearing purposes, as described above.

The effects of the submicroscopic form of the starch are dramatically illustrated in the increased stability of the emulsion and in the stability of the emulsion with much lower starch contents than were acceptable in prior art similar emulsions. In the present emulsions, the starch content can be as low as 8%, based on the weight of the fat, and more than about 20% starch, based on the weight of the fat, provides no further advantage. Prior art similar emulsion required much greater amounts of starch. For example, in U.S. Pat. No. 4,331,689, the starch is about 50 to 85% by weight of the fat. Such exceptionally high starch contents, as required by that patent, most adversely affect the resulting product, both in terms of viscosity, taste and stability. Similarly, U.S. Pat. No. 4,045,589 requires the starch to be about 40 to 120% of the fat. Another undesired result of the high starch content is the resulting decreased amount of fat in the emulsion, which in turn causes decreased functionality. For example, the composition of U.S. Pat. No.

4,045,589 requires 5.6 grams of whitener to provide the same whiteness in brewed coffee as 3.0 grams of a commercial, protein-containing whitener (Coffeemate). This should be compared with the present results reported in Example 1 herein.

The method of producing the composition is not particularly critical, and generally speaking, the fat, emulsifier, starch, filler and any other optional ingredients are admixed with water, mechanically sheared such that the fat is divided into average particle sizes of 4 microns or less and dried to a moisture content of 7% or less (the starch being placed in submicroscopic form either prior to the admixing or during the shearing step). More often, however, a moisture content of 5% or less will be reached, e.g., a moisture content of 3% or less.

While the starch may be placed in submicroscopic form prior to the steps of processing the ingredients to an emulsion, this is an unnecessary additional step, and for this reason, it is preferred that the starch be placed in the submicroscopic form during the processing to an emulsion. Thus, the starch may be cooked in water at elevated temperatures sufficient to cause the starch granules to hydrate and swell, and the swollen granules are added to the admixture, or the admixture (with unswollen starch) may be cooked, prior to shearing, at elevated temperatures sufficient to cause the starch granules to hydrate and swell. In either case, the shearing will produce the submicroscopic form of the starch. The cooking, in either case, may be in the presence of an acid, as explained above.

Conveniently, the water soluble or dispersible ingredients are first mixed in the water used in making the emulsion and the fat soluble or dispersable ingredients are mixed in this fat used in making the emulsion. The water mixture and the fat mixture are then admixed to produce an emulsion. That emulsion is conveniently homogenized in a conventional dairy homogenizer operated at high shearing to divide the fat into average particle sizes of 4 microns or less and produce the submicroscopic form of the starch. The finely divided fat emulsion is then dried to produce the powdered dry composition. With adequate cooking, the conventional dairy homogenizer can be operated at pressures as low as 1000 psig, but from 2000 psig to 5000 psig is preferred, e.g. 2000 to 3000 psig in a single stage or 2000 to 3000 psig in a first stage and 500 psig in a second stage (in a double stage homogenizer) to insure the submicroscopic form of the starch.

The mode of heating for the cooking is not critical and may be simply a jacketed vessel, or a high temperature short time heating apparatus may be used. Good agitation during the cooking step, however, is preferred.

The drying step may be that of freeze drying, vacuum drying or spray drying, although spray drying is preferred. The spray dryer may be a box dryer or tower dryer operated at conventional temperatures. Thus, in a tower dryer, an inlet temperature of 300° to 350° F. and an outlet temperature of 170° to 200° F. are quite satisfactory. In a box dryer an inlet temperature of 310° to 380° F. and an outlet temperature of 190° to 250° F. are quite satisfactory.

The dried powder is collected from the dryer and packaged in conventional containers, e.g. drums, bags and the like, although the packages should be capable of protecting the powder from undue moisture transfer.

The use of submicroscopic form starch provides a number of very important advantages. First of all, the starch is relatively inexpensive, as opposed to protein. Thus, the present compositions are considerably less expensive to manufacture from a raw materials cost point of view. Further, in this regard, the submicroscopic form of starch allows the use of considerably less starch than that required when conventional starch is used, e.g. conventional starches such as the chemically modified dextrinized starch of U.S. Pat. No. 4,045,589, or the lipophilic starch of U.S. Pat. No. 4,331,689, as discussed above. Therefore, not only is the present starch less expensive than protein, but the cost of the emulsion is still considerably reduced, as opposed to conventional starches, since the amount of the present starch required for acceptable results is much lower than that required for conventional starches. Also, the present starch has little detectable effect on the viscosity of the dissolved emulsion. Further, as opposed to chemically modified dextrinized starch, the present starch will very rapidly dissolve in brewed coffee. The present starch, and the low level thereof, provides an additional advantage in processing since only a very slight increase in viscosity of the emulsion to be dried is experienced. This low increase in viscosity makes possible the drying of the emulsion with high solids content, i.e. up to as high as about 75% solids, with up to about 65% being quite satisfactory. This reduces the amount of water which must be used in forming the emulsion to be dried, and conserves both dryer capacity and energy for drying. Of course, it is not necessary to use such high solids content, and solid contents as low as 10 to 15% may be used if desired, although this is not recommended.

Thus, it can be seen that the objects of the invention have been achieved. The present emulsion is protein-free and, hence, may be sodium-free. In this latter regard, protein-free and sodium-free mean that the as dried composition (e.g. starch, fat, filler and emulsifier—with or without above described optional ingredients) essentially has no protein or sodium therein. This does not mean that the dried composition may not be subsequently compounded with protein or sodium compounds for special uses and compositions. For example, compositions which mimic natural cream, e.g. soft-serve "ice creams", "cream" type whipped toppings, "cream" type sauces and the like, will include the present emulsion, but conventionally also have protein, etc. therein. However, on an as dried basis, the present emulsion will usually consist essentially of the predominate submicroscopic form of a hydrated, substantially undextrinized, lipophilic starch, fat, filler and emulsifier (also may contain the above-identified optional and non-functional ingredients). The added ingredients, e.g. protein, used to make these special compositions, are not part of the emulsion, but merely admixed with the emulsion.

The present fat emulsions can be used in liquid or dry compositions and are both hot and cold water soluble. The present emulsions are hard water stable and have no or low sodium content. The emulsion can be prepared in a wide variety of fat contents, e.g. 20%, 35%, 50% and 65% fat. The present emulsions have a number of advantages and the following will illustrate these advantages in connection with specific types of compositions into which they may be incorporated.

Thus, coffee whiteners compounded with the present fat emulsions have low ingredient cost, are hard water stable, have low sodium contents, and are ethnically acceptable.

The present emulsions in creamy orange drinks are acid stable, cold water soluble and can be mixed without the aid of a blender. The same is true for brewed ice tea (or hot tea).

In gelatin desserts, the present emulsions add body, mouthfeel, creaminess, opaqueness and are acid stable (fruit flavored desserts).

Sherbet type mixes with the present emulsions as the base are acid stable, have decreased evaporation and a clean flavor, while frozen desserts are similar in properties.

The present emulsions in shortening powders renders the powders acid and heat stable.

In salad dressing containing vinegar, the present emulsions are acid stable (the fat will not separate) and low caloric.

Soups and gravies, made with the present emulsion are acid stable, heat stable, and may have low or no sodium content and no protein.

Creamed soft drinks and non-dairy bar mixes are acid stable, of clean flavor, creamy and cold water soluble when compounded with the present emulsion.

Cocoa mixes (hot and cold), when compounded with the present emulsion, are creamy, stable and have a pleasant fat content.

The invention will now be illustrated by the following examples, but it is to be undersood that the invention is not limited thereto and extends to the scope of the foregoing disclosure and following claims. In the examples, as well as in the specification and claims, all parts and percentages are by weight unless otherwise specified.

EXAMPLE 1

The ingredients of this example, which makes a coffee whitener, were as follows:

| | |
|---|---|
| Starch (National 1817) | 3.5% |
| Corn Syrup solids (filler) | 71.64 |
| Partially hydrogenated soy oil | 20.0 |
| Mono-diglyceride, 135° F. (emulsifier) | 0.2 |
| 75% phosphoric acid | 0.15 |
| Sodium Acid Pyrophosphate | 0.15 |
| Sodium-stearoyl-2-lactylate (emulsifier) | 0.5 |
| Cream flavor (Firmenich 59.200) | 0.006 |
| Xanthan gum (Keltrol F - stabilizer) | 0.2 |
| TiO$_2$ | 0.8 |
| Riboflavin (color) | .0006 |
| Moisture | 3.5 |

The procedure used was as follows. The starch and xanthan gum were blended. The phosphoric acid and sodium acid pyrophosphate were added to sufficient warm water (140° F.) for processing and the starch and xanthan gum blend was added to the water mixture and cooked at 185° F. for 15 minutes. The fats were heated to 140° F. and the emulsifiers were added thereto and mixed for a minimum of 5 minutes. The TiO$_2$ was added to the cooked starch mixture and then that mixture was added to the fat mixture. To the thus formed starch/fat mixture was added the corn syrup solids, the flavor and color. The solids content was 60%. The mixture was stirred for 15 minutes at 150° F. and pumped through a 60 T valve at 80 psi to a storage tank, in the storage tank the mixture was heated to 180° F. and then homogenized in a conventional dairy homogenizer at 3,500 psig.

The homogenized mixture (with the then submicroscopic form of the starch) was dried in a tower dryer with a 340°-360° F. inlet, 180° to 195° F. outlet, 0.3-1 inch vacuum using a line pressure of 1,300 psi and 48×28, 40×27 nozzles. To the dried powder was added a flow agent (sodium silico aluminate-99.5% powder and 0.5% flow agent).

The density of the powder was approximately 220 grams per pint and had a free fat content of 0.7%, tested by extraction with petroleum ether and ethyl ether (50/50). When 3 grams of the coffee whitener were placed in 5 ounces of hot brewed coffee (180° F.) the whitener sank underneath the surface of the coffee in 5 seconds and could be totally solubilized with only two or three stirs of a spoon. No settling of the whitener was observed and no restirring of the coffee was required. The coffee had a well defined cream flavor with no oiling out. No agglomerations or sediments were detectable in the coffee.

The whiteness of the coffee whitener was compared with a commercially available coffee whitener (Coffeemate) by placing 3 grams of each in respective 5 ounce containers of freshly brewed coffee (180° F.) and visually comparing the whiteness thereof. No detectable difference in the whiteness was discernible.

The product of this example was tested in a triangulation test against four commercially available coffee whiteners. The present product was preferred, with Coffeemate next preferred.

The sodium content of a serving for whitening purposes of the present composition was only 2 miligrams. Less than 5 miligrams is defined to be no sodium for dietary purposes.

Variations of the foregoing procedure may be used, as well as variations of the ingredients. The following will illustrate those variations with the procedure noted in brief form.

EXAMPLE 2

| Ingredients: | |
|---|---|
| Starch (National 1817) | 4.8% |
| Partially hydrogenated coconut oil | 16.0 |
| Partially hydrogenated soy oil | 16.0 |
| Corn syrup solids | 58.7 |
| Mono-di-glycerides, 145° F. melting point | 1.0 |
| Lecithin | 0.04 |
| Moisture | 3.5 |

The general procedure of Example 1 was followed with the below conditions:

1. Heat starch in water to 185° F. for 10 minutes. Add mono- and di-glycerides and mix for 5 minutes.
2. Add lecithin to heated oils. Heat to 135° F. and mix for five minutes.
3. Add starch solution to oil mixture. Add corn syrup solids. Hold at 150° F. for 15 minutes. Total solids 55-65%.
4. Pump through 60 T at 80 psig to dryer storage tank.
5. Preheat at 180° F. on the way to the homogenizer.
6. Homogenize at 2800 psig.
7. Spray dry:
    a. inlet temperature: 320°-340° F.
    b. Vacuum: 0.2-0.3
    c. Outlet temperature: 185°-195° F.
    d. Nozzles: 6-44×21, 1-46×21
    e. Line pressure to dryer: 1500 psig.
8. Add flow agent (Zeolex 23A) at the rate of 0.6%.

The coffee whitener emulsion base so produced had essentially the same physical properties as those described in Example 1. This emulsion base may then be compounded with desired color, flavors, etc., to provide a customized coffee whitener.

EXAMPLE 3

| Ingredients: | |
|---|---|
| Starch (National 1817) | 4.8% |
| Partially hydrogenated soy oil | 30.0 |
| Corn syrup solids | 58.9 |
| Sodium acid pyrophosphate | 0.18 |
| 75% Phosphoric acid | 0.10 |
| Mono- and di-glycerides, 145° F. melting point | 0.90 |
| lecithin | 0.12 |
| Sodium citrate | 2.0 |
| Moisture | 3.0 |

The general procedure of Example 1 was followed with the below conditions:
1. Dissolve the phosphoric acid and the sodium acid pyrophosphate in sufficient water to create a mixture at between 55-65% total solids when all the ingredients are added. Add the starch and heat to 185° F. for 10 minutes. Add the mono- and di-glycerides to the water mixture and mix for an additional 5 minutes.
2. Add the lecithin to the soy oil, heated to 140° F., and mix for at least 5 minutes.
3. Add the starch mixture to the oil mixture, with agitation, and then add the corn syrup solids and the sodium citrate. Mix for 15 minutes at a temperature of 150° F.
4. Pump the mixture through a 60 T valve at 80 psig to the dryer surge tank.
5. Preheat the mixture to 180° F. on the way to the homogenizer.
6. Homogenize at 2800 psig single stage or 500 psig second stage, 2800 psig total.
7. Spray dry:
   inlet temperature: 320°-360° F.
   outlet temperature: 180°-185° F.
   nozzles: 6×51-27 and 1×40-28
   line pressure to dryer: 1000-1500 psig
8. Add 0.5% flow agent at dryer shifter.

The creamer emulsion base so produced had essentially the same physical properties as those described in Example 1.

EXAMPLE 4

| Ingredients: | |
|---|---|
| Starch (National 1817) | 7.5% |
| Sodium acid pyrophosphate | 0.16 |
| 75% Phosphoric acid | 0.12 |
| Mono- and di-glycerides, 145° F. melting point | 1.37 |
| Partially hydrogenated coconut oil | 49.0 |
| Corn syrup solids | 39.2 |
| Lecithin | 0.15 |
| Moisture | 2.5 |

The general procedure of Example 1 was followed with the below conditions:
1. Dissolve the phosphoric acid and the sodium acid pyrophosphate in sufficient water to create a mixture at between 55-60% total solids when all the ingredients have been added. Add the starch and heat to 185° F. and hold for 10 minutes with agitation. Add the mono- and di-glyceride to the water mixture and mix for an additional 5 minutes.
2. Add the lecithin to the coconut oil, heated to 140° F., and mix for at least 5 minutes.
3. Add the starch mixture to the oil mixture, add the corn syrup solids and mix for 15 minutes at 150° F.
4. Pump the mixture through a 60 T valve at 80 psig to the dryer surge tank.
5. Preheat the mixture to 180° F. on the way to the homogenizer.
6. Homogenize at 2600 psig single stage or 500 psig second stage, 2600 psig total.
7. Spray dry:
   inlet temperature: 300°-350° F.
   outlet temperature: 180°-185° F.
   nozzles: 6×48-27, 1×40-28
   line pressure to dryer: 1000 psig.

The emulsion so produced is a general purpose acid stable creamer. It has exceptional stability properties for use in acid puddings and the like.

EXAMPLE 5

| Ingredients: | |
|---|---|
| Starch (National 1817) | 6.5% |
| Partially hydrogenated coconut oil | 50.0 |
| Diacetyl tartaric acid esters of mono- and di-glycerides | 0.65 |
| Citric acid | 0.15 |
| Corn syrup solids | 39.7 |
| Moisture | 3.0 |

The general procedure of Example 1 was followed with the below conditions:
1. Dissolve the citric acid in water, add the starch and heat to 185° F. for 10 minutes with agitation.
2. Add the diacetyl tartaric acid ester of mono- and di-glycerides to the coconut oil heated to 140° F. and mix for at least 5 minutes.
3. Add the starch mixture to the oil mixture, and then add the corn syrup solids, heat to 150° F. and agitate for 10 minutes.
4. Pump the mixture through a 60 T valve at 80 psig to the dryer surge tank.
5. Preheat the mixture to 180° F. on the way to the homogenizer.
6. Homogenize at 3000 psig single stage.
7. Spray dry:
   inlet temperature: 330°-350° F.
   outlet temperature: 180°-185° F.
   nozzles: 6×48-27, 1×40-28
   line pressure: 1000-1500 psig The emulsion so produced is a low-sodium general purpose creamer which also is stable in acid compositions.

EXAMPLE 6

| Ingredients: | |
|---|---|
| Starch (National 1817) | 7.5% |
| Sodium acid pyrophosphate | 0.15 |
| 75% phosphoric acid | 0.15 |
| Partially hydrogenated soy oil | 50.0 |
| Sodium stearoyl lactylate | 0.3 |
| Corn syrup solids | 38.5 |
| Mono- and di-glycerides, 145° F. melting point | 0.9 |

-continued

| Ingredients: | |
|---|---|
| Moisture | 2.5 |

The general procedure of Example 1 was followed with the below conditions:
1. Add the sodium acid pyrophosphate and the 75% phosphoric acid to sufficient water to create a mixture with between 55-65% total solids when all the ingredients have been added. Add the starch and heat to 185° F. and hold for 10 minutes. Add the mono- and di-glycerides and hold for an additional 5 minutes.
2. Add the sodium stearoyl lactylate to the soy oil, heated to 140° F., and mix for at least 5 minutes.
3. Add the starch mixture to the oil mixture with agitation, and then add the corn syrup solids. Agitate for 15 minutes at a temperature of 150° F.
4. Pump the mixture through a 60 T valve at 80 psig to the dryer surge tank.
5. Preheat the mixture to 180° F. on the way to the homogenizer.
6. Homogenize at 2700 psig single stage or 500 psig second stage, 2700 psig total.
7. Spray dry:
   inlet temperature: 330°-350° F.
   outlet temperature: 180°-185° F.
   nozzles: 6×48-27, 1×40-28
   line pressure: 1000-1500 psig The so produced emulsion is an acid stable general purpose creamer.

EXAMPLE 7

A similar procedure as Example 1 was used, but with the following ingredients:

| Starch (National 1817) | 5.0% |
|---|---|
| Corn syrup solids | 27.5 |
| 75% phosphoric acid | 0.16 |
| SAPP (sodium acid pyrophosphate) | 0.14 |
| Moisture | 1.6 |
| Partially hydrogenated soy oil | 65.0 |
| Sodium stearoyl-2-lactylate | 0.6 |

A powdered shortening was produced with a high fat content, i.e. 65%, which is most useful in cake mixes and sauces.

We claim:
1. A high stability, protein-free, rapidly cold water soluble, fat emulsion, which comprises on a solids basis:
   (a) 10 to 75% of an edible fat having an average particle size of 4 microns or less;
   (b) 0.1 to 3% of an edible emulsifier; and
   (c) 8 to 20%, based on the weight of the fat, of an edible, hydrated, substantially undextrinized lipophilic starch, which is predominately in a submicroscopic form;
   the remainder of the solids being principally an edible filler.
2. The composition of claim 1 wherein the emulsion is a dry, powdered emulsion.
3. The composition of claim 1 wherein the emulsion is a water emulsion containing up to 50% of the said solids.
4. The composition of claim 1 wherein the average particle size of the fat is from 0.5 to 1.5 microns.
5. The composition of claim 1 wherein there is from 15 to 40% fat and the composition is a coffee whitener.
6. The composition of claim 5 wherein there is from 32 to 37% fat.
7. The composition of claim 3 in a refrigerated or frozen form.
8. The composition of claim 1 wherein the fat is selected from the group consisting of coconut oil, soybean oil, corn oil, safflower seed oil, rape seed oil and mixtures thereof.
9. The composition of claim 1 wherein the emulsifier is selected from the group consisting of mono- and di-glycerides, sodium stearoyl lactylate, lecithin and mixtures thereof.
10. The composition of claim 1 wherein the starch is selected from a lipophilic modification of waxy maize, rice, wheat, corn, potato, tapioca starches and mixtures thereof.
11. The composition of claim 1 wherein the starch is essentially only in submicroscopic in form.
12. The composition of claim 1 wherein the filler is a carbohydrate.
13. The composition of claim 12 wherein the filler is selected from the group consisting of corn syrup solids and malto-dextrins.
14. The composition of claim 1 which also includes one or more of flavors, colors, stabilizers, preservatives and anti-caking agents.
15. The composition of claim 2 in a freeze-dried form.
16. The composition of claim 2 in a spray-dried form.
17. A method for producing the composition of claim 1 comprising forming an admixture of the fat, emulsifier, starch and filler with water, mechanically shearing the admixture such that the fat is divided into an average particle size of 4 microns or less and drying the sheared admixture to a moisture content of 7% or less, and wherein the starch is predominately in a submicroscopic form.
18. The method of claim 17 wherein the starch is cooked in water at an elevated temperature sufficient to cause the starch granules to hydrate and swell such that when the granules are added to the admixture the shearing will produce the submicroscopic form thereof.
19. The method of claim 17 wherein the admixture is cooked, prior to shearing, at an elevated temperature sufficient to cause the starch granules to hydrate and swell such that the shearing will produce the submicroscopic form of the starch.
20. The method of claim 17 wherein the starch is essentially in submicroscopic form.
21. The method of claim 17 wherein the elevated temperature is at least 175° F.
22. The method of claim 21 wherein the elevated temperature is at least 180° F.
23. The method of claim 17 wherein the shearing is carried out in a dairy homogenizer at a total pressure of at least 1000 psig.
24. The method of claim 17 wherein the drying is carried out in a freeze dryer or a vacuum dryer or a spray dryer.
25. The method of claim 24, wherein the dryer is a spray dryer.

* * * * *